Sept. 25, 1928.
W. H. THIEMER
1,685,509
UNIVERSAL JOINT
Filed Nov. 17, 1922
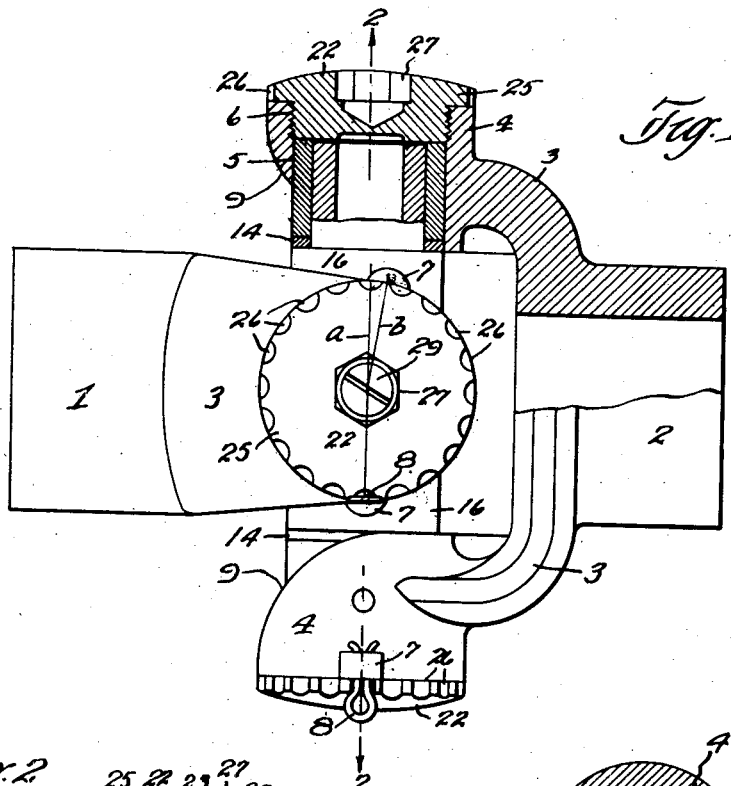
Fig. 1
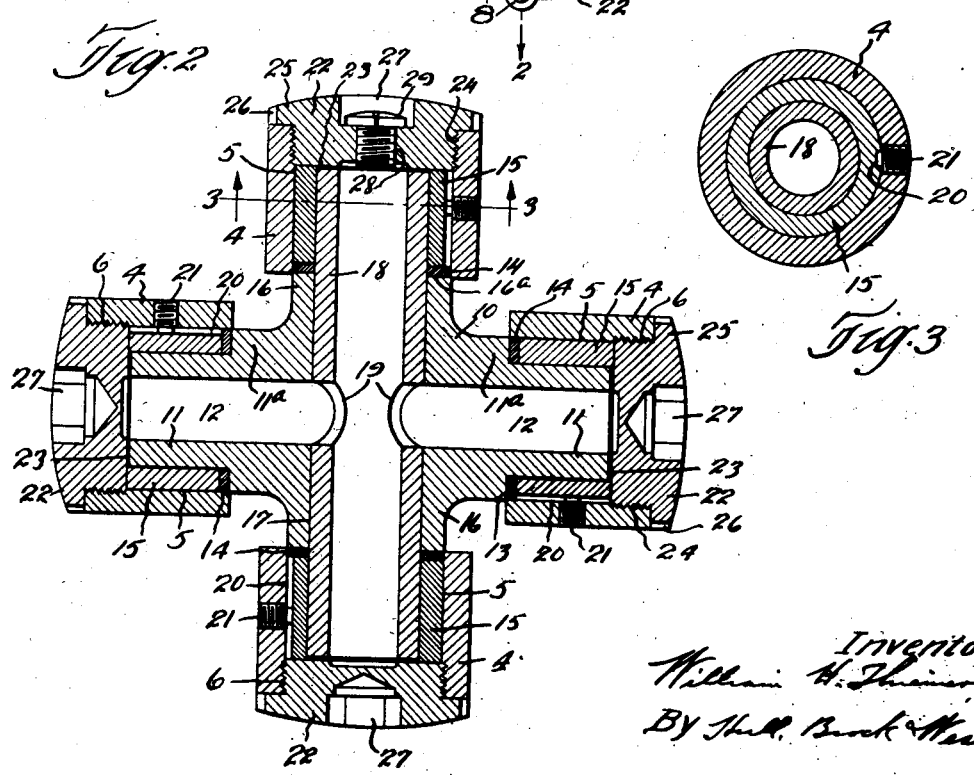
Fig. 2
Fig. 3
Inventor
William H. Thiemer
By their Attys.

Patented Sept. 25, 1928.

1,685,509

UNITED STATES PATENT OFFICE.

WILLIAM H. THIEMER, OF CLEVELAND, OHIO, ASSIGNOR, BY MESNE ASSIGNMENTS, TO SPICER MANUFACTURING CORPORATION, OF SOUTH PLAINFIELD, NEW JERSEY, A CORPORATION OF VIRGINIA.

UNIVERSAL JOINT.

Application filed November 17, 1922. Serial No. 601,457.

This invention relates to universal joints, and has for its general object to improve the mode of construction and the efficiency of joints of the lubricating type. More limitedly, the objects are to provide a particularly efficient fluid-tight joint at the outer end of each of the trunnion pins; to secure, in universal joints of this character, extreme fineness of adjustment of the caps which close the outer ends of the bearing block bores, whereby compensation may be made for the wearing of the parts and the leakage of oil may be prevented; to improve the means for preventing leakage of lubricant between the inner ends of the bushings and the shoulders of the cross member with which they cooperate; also to provide a joint which is particularly adapted for use with light or thin commercial lubricating oil.

The foregoing objects and others which will appear hereinafter may be realized through the construction and arrangements of parts shown in the drawings hereof, wherein Fig. 1 represents a sectional elevation of a joint constructed in accordance with my invention. Fig. 2 is a sectional view on the line 2—2 of Fig. 1; and Fig. 3 a sectional detail corresponding to the line 3—3 of Fig. 2, looking in the direction of the arrows.

Describing the parts by reference characters, 1 and 2 denote the hubs of the joint, which hubs are adapted to be attached in the usual manner to their respective shaft sections (not shown). Each hub is provided with a pair of integral arms 3 each provided with a bearing block 4 having a bore 5 extending therethrough, the outer end of each bore being threaded, as shown at 6. Each block is provided with a pair of lugs 7 arranged nearly diametrically opposite each other, each lug having a bore therethrough for the reception of part of a cotter pin 8. The particular arrangement of the lugs will be explained hereinafter in connection with the caps with which they cooperate. The outer portion of each bearing block which is presented toward the cross member is beveled away, as shown at 9, to facilitate assembling.

The cross member comprises a central body 10, preferably made as a forging and having one pair of opposed integral trunnions 11 integral with the arms 11ª extending from the center of the cross member. Each trunnion 11 is provided with a bore 12 extending therethrough and communicating with the hollow central portion of the cross member. An annular shoulder 13 defines the outer end of each arm 12 and forms a support for a packing washer 14, preferably of cork, and for the inner end of a bushing 15 which abuts directly against such washer.

Projecting from the central portion of the cross member are the other arms 16, the outer ends of said arms being of such length as to be received between their cooperating bearing blocks. These arms are provided each with a bore 17, preferably of greater diameter than the bores 12, so that they may receive therewithin a hollow pin or sleeve 18 having the same internal diameter as the bores 12 and of sufficient length to enable its outer ends to constitute trunnions. The hollow pin or sleeve 18 is provided with opposed apertures 19 adapted to register with the inner ends of the bores 12, whereby the central portion of the cross member and the trunnions will constitute a receptacle for lubricant.

The outer ends of the arms 16 constitute shoulders 16ª similar to the shoulders 13 for the washers 14 and bushings 15. Each bushing is provided with a longitudinal keyway 20 adapted to receive the reduced inner end of a locking pin 21 threaded into the appropriate bearing block 4.

In assembling, the cross member with the integral trunnions 11 will be applied to one pair of arms, which can be done by inserting one trunnion and sleeve as far as possible into the inner end of one of the bearing blocks, and the beveling of the opposite block at 9 will enable the opposite trunnion to be swung into line with the bore of its bearing block, and the cross member may then be centered with respect to the bearing blocks. The ends of the arms 16 will be brought into line with and just clear the inner ends of the other pair of bearing blocks, after which the hollow pin or sleeve 18 may be inserted. The washers 14 and bushings 5 may be then applied, and the outer end of each bearing block, bushing, and trunnion will then be closed by means of a cap 22, each cap having at its inner end an annular ledge 23, a cylindrical threaded portion 24 extending outwardly from such ledge and a radially outwardly extending flange 25. The parts will be so proportioned that, when the cap is screwed home (with the flange 25 engaging the outer end if its bearing block) there will preferably be about one two-thousandth inch clearance between the ledge 23 and the outer end of the cooperating trunnion to permit a film of oil between these parts, while the said ledge will have forced the inner end of the bushing against its cooperating washer thereby to compress the latter against its shoulder. As but a small portion of the inner end of each bearing block is rounded away at 9, each washer is prevented from expanding outwardly or laterally under this pressure by the overlapping inner end of its bearing block.

Reference has been made heretofore to the fineness of adjustment of the caps which close the outer ends of the bearing block bores. This fineness of adjustment is conveniently obtained by providing the edge of each cap 22 with vertical notches 26. Twenty such notches are shown herein, although the number may be varied if desired. The centers of the lugs 7 are off-set from a diametrical line $a$ by half the angular distance between a pair of adjacent notches, as indicated by the line $b$. With this arrangement, when a notch 26 is brought into register with the corresponding segmental bore of one of the lugs 7 (thereby enabling the cotter pin 8 to be inserted jointly into said notch and bore) the other lug will be located midway between a pair of notches. With twenty such notches in the cap, the latter may be adjusted to forty different angular locking positions for each rotation thereof. By using a sufficiently fine thread at 6 and 24, a correspondingly fine adjustment of the cap may be obtained, an adjustment as fine as one two-thousandth of an inch being easily obtainable with standard-thread practice. This fineness of adjustment is particularly desirable for the purpose of taking up the end play between the trunnions and the caps as such play develops.

Each of the caps 22 is provided with an angular socket 27 adapted to receive a suitable wrench, and one of such caps is provided with a filling opening 28 for the application of the lubricating oil to the interior of the cross, with a plug 29 for closing such aperture.

Having thus described my invention, what I claim is:

1. In a universal joint the combination of a cross member having trunnions each provided with a bore communicating with the central portion of such member, bearing blocks adapted to receive the said trunnions, a cap threaded into the outer end of each bearing block, each cap having a circular head provided with peripheral equi-distantly spaced notches, and a pair of locking members carried by each block and so arranged as to engage alternately a notch in the said cap as the cap is screwed into or out of the said bearing block.

2. In a universal joint, the combination of a cross member having trunnions each provided with a bore communicating with the central portion of such member, bearing blocks adapted to receive the said trunnions, a cap threaded into the outer end of each bearing block, each cap having a circular head provided with peripheral equi-distantly spaced notches, each bearing block having a pair of lugs arranged nearly diametrically opposite each other and each lug having an aperture, and a pin insertable into the aperture of each lug, the lugs being so arranged that the pins carried thereby may engage alternately a notch in the corresponding cap as the said cap is screwed into or out of its bearing block.

3. In a universal joint, the combination of a driving and a driven member each provided with a pair of arms each having a bearing block provided with a bore extending from the inner end thereof, the inner portions of the bearing blocks carried by one pair of arms being beveled outwardly toward the sides which are remote from such arms, a cross member having a pair of integral arms and trunnions adapted to be inserted into the bores of the last mentioned bearing blocks and having a pair of short integral hollow arms adapted to be received between the inner ends of the other pair of bearing blocks, one of the last mentioned bearing blocks having a through bore, a pin insertable through such bore and through the short hollow arms of the said cross member to form trunnions, and a cap removably closing the outer end of the bore of the last mentioned bearing block.

4. In a universal joint, the combination of a driving and a driven member each provided with a pair of arms each having a bearing block provided with a bore extending from the inner end thereof, the inner portions of the bearing blocks carried by one pair of arms being beveled outwardly toward the sides which are remote from such arms, a cross member having a pair of integral arms and trunnions adapted to be inserted into the bores of the last mentioned bearing blocks and having a pair of short integral hollow arms adapted to be received between the inner ends of the other pair of bearing blocks, one of the last mentioned bearing blocks having a through bore, a pin insertable through such bore and through the short hollow arms of the said cross member to form trunnions, a bushing within the bore of each bearing block and having its inner end within the inner end of such bore, a washer interposed between the inner end of each bushing and a shoulder formed by the adjacent portion of the cross member, the said washers being located within the inner ends of the bearing block bores, and a cap removably closing the outer end of the bore of the last mentioned bearing block.

In testimony whereof, I hereunto affix my signature.

WILLIAM H. THIEMER.